Figure 1:
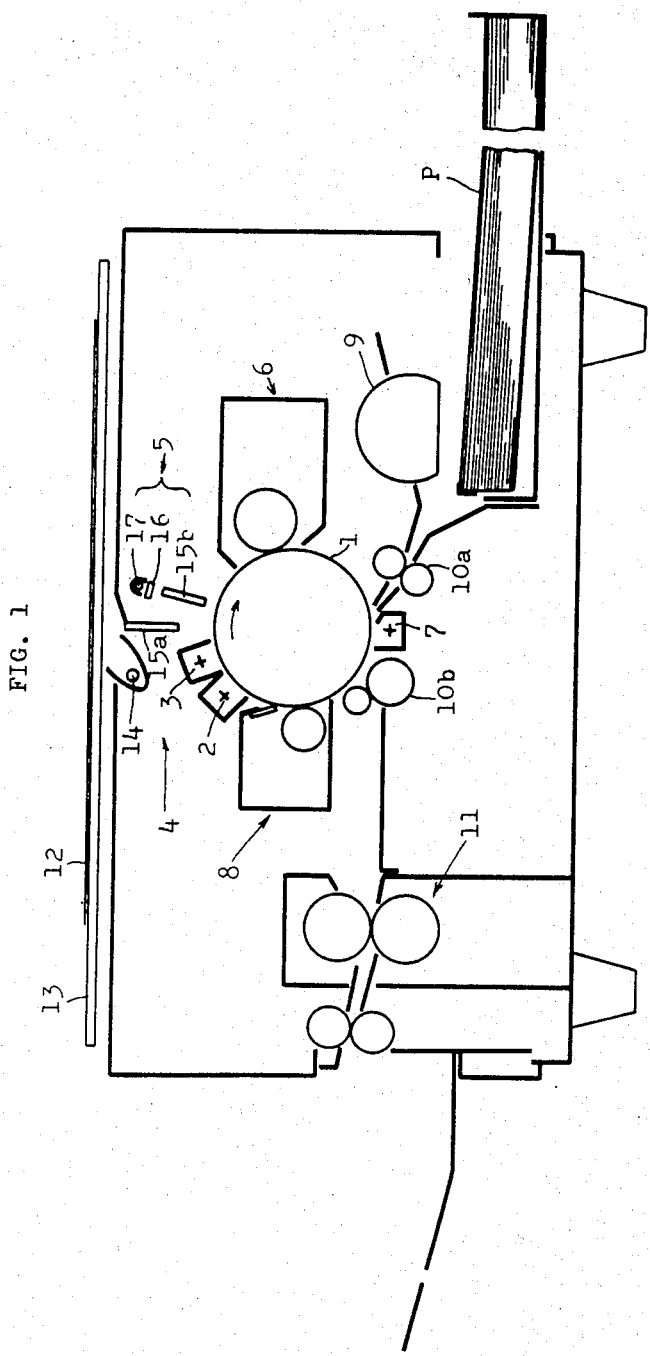

United States Patent [19]

Inamori et al.

[11] Patent Number: 4,527,886
[45] Date of Patent: Jul. 9, 1985

[54] ELECTROPHOTOGRAPHIC RECORDING APPARATUS HAVING BOTH FUNCTIONS OF COPYING AND PRINTING

[75] Inventors: Kazuo Inamori; Katsuhiko Gotoda, both of Kyoto, Japan

[73] Assignee: Kyoto Ceramic Co., Ltd., Japan

[21] Appl. No.: 375,042

[22] Filed: May 5, 1982

[30] Foreign Application Priority Data

| May 12, 1981 | [JP] | Japan | 56-71880 |
| May 12, 1981 | [JP] | Japan | 56-71881 |
| May 12, 1981 | [JP] | Japan | 56-71882 |
| May 25, 1981 | [JP] | Japan | 56-79885 |
| May 25, 1981 | [JP] | Japan | 56-79886 |
| Jun. 5, 1981 | [JP] | Japan | 56-87368 |
| Jun. 5, 1981 | [JP] | Japan | 56-87387 |

[51] Int. Cl.³ .................................. G03G 15/00
[52] U.S. Cl. ............................... 355/3 R; 355/1
[58] Field of Search ............ 355/3 DR, 3 BE, 1, 3 R

[56] References Cited

U.S. PATENT DOCUMENTS 3,707,322  12/1972  Wysocki et al. ............ 350/160 LC
4,166,691   9/1979  Ebi et al. .......................... 355/11

Primary Examiner—A. T. Grimley
Assistant Examiner—David Warren
Attorney, Agent, or Firm—Spensley Horn Jubas & Lubitz

[57] ABSTRACT

This invention relates to an electrophotographic copying and printing apparatus having copying function and printing function.

An object of the invention is to provide an electrophotographic copying and printing apparatus comprising a photosensitive member having the photosensitivity to electrical charge in positive and negative polarities, an electrically charging unit for charging the surface of the photosensitive member in either positive or negative polarity, an exposure unit for copying including an optical system by which an optical image corresponding to an image of an original placed on a support table therefor is irradiated onto the charged surface of the photosensitive member, an optical image scanning unit for printing including an optical system which irradiates a recording region corresponding to a record signal onto the charged surface of the photosensitive member, and a single developing unit, so that the charge polarity of the photosensitive member is inverted of positive and negative in the copying mode and printing mode and the single developing unit can perform normal development in the copying mode and reverse development in the printing mode, thus being small-sized, inexpensive to produce, and easy to operate.

16 Claims, 6 Drawing Figures

ELECTROPHOTOGRAPHIC RECORDING APPARATUS HAVING BOTH FUNCTIONS OF COPYING AND PRINTING

This invention relates to an electrophotographic copying and printing apparatus of copying and printing functions.

Recently, various informations have been output as characters or patterns and high-speed-processed following development of electronic computers of high-performance.

In order to cope with such information processing system highly improved and complicated, the printing apparatus has been changed gradually from the conventional impact printer (mechanical printer) to a high-speed non-impact printer. Especially, an electrophotographic printing apparatus, which utilizes the existing electrophotography improved in the field of copying machine, is now used as the typical non-impact printer because high-speed print is possible, plain paper is available for printing, less noise is created, and the reliability is high, thus performing its important duty in the information process field.

By paying attention to that the fact electrophotographic printing apparatus has recently used electrophotography in the same way as an electrophotographic copying apparatus, a multifunction electrophotographic printing apparatus has been developed which has printing function as the information processing apparatus together with copying function as a copying apparatus.

Such copying and printing apparatus incorporates a usual electrophotographic copying apparatus with optical image scanning unit for printing, which houses a cathode-ray tube (to be hereinafter called CRT) including a laser beam or optical fibre tube in order to reproduce, for example, a record signal output from the electronic computer or that transmitted by the facsimile, as the optical image on the photosensitive member.

Now, a region for recording characters or patterns is usually about 10% in an area ratio of recording paper and a not-recorded area, i.e., the blank, is said to be about 90%.

The conventional technique using the laser beam or CRT, however, is made to irradiate a region corresponding to the blank to form a latent image on the surface of photosensitive member uniformly charged, whereby the photosensitive member is easy to be fatigued and reduced in the life-time, resulting in that frequent exchanges of photosensitive drum are compelled.

Also, the life-time and stability of the laser beam scanning line or CRT are unfavorably affected, whereby the apparatus has a serious defect in its durability as a whole.

To eliminate the above defect, it is enough for the printer mode to form the so-called negative latent image having an electric charge in the region corresponding to the blank to thereby perform the reverse development. The apparatus of both the copying function and printing function, however, is required to provide two developing devices, i.e., one containing toner for the copying mode and the other containing toner for the printing mode. Therefore, two corona charging devices for image transfer unit giving the opposite polarity to the toner are required, thereby unavoidably making the apparatus large and expensive to produce.

In order to eliminate the above defects this invention has been designed. An object of the invention is to provide an electrophotographic copying and printing apparatus which uses, as the photosensitive member, a photo-conductor having the photosensitivity to electrical charge in positive and negative polarities and simply inverts the charge polarity of the photosensitive member according to either copying mode or printing mode so that a single developing unit is used to perform the normal development in the copying mode and the reverse development in the printing mode, thus saving components in number and facilitating its operation.

Next, an embodiment of an electrophotographic copying and printing apparatus will be detailed in accordance with the drawings.

Figure 2:
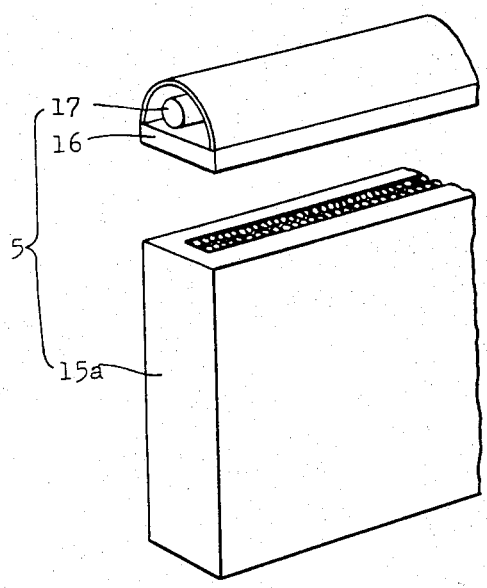
Figure 3:
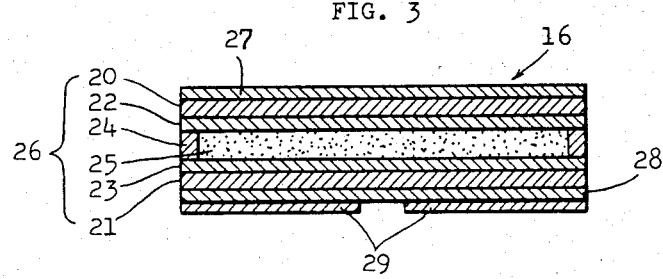
Figure 4:
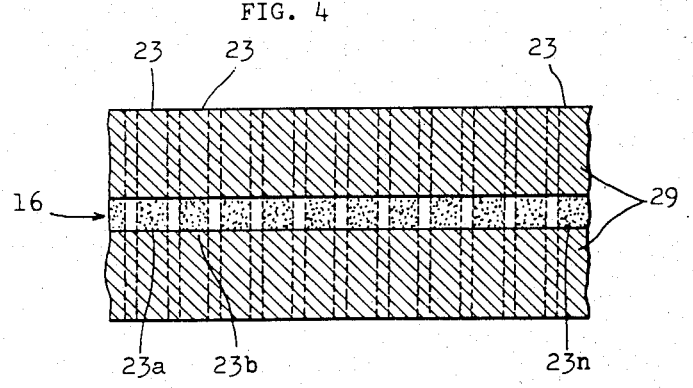
Figure 5:
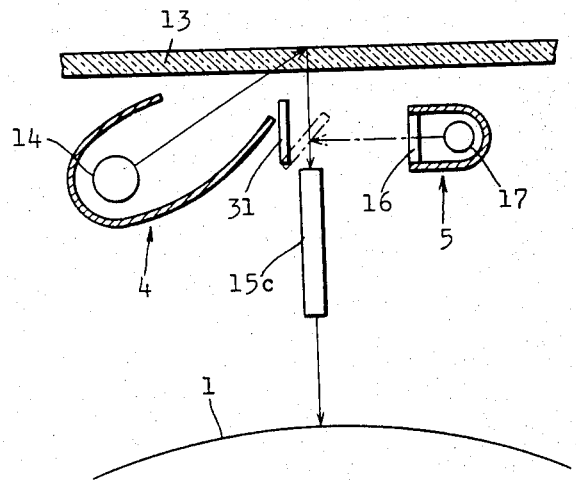
Figure 6:
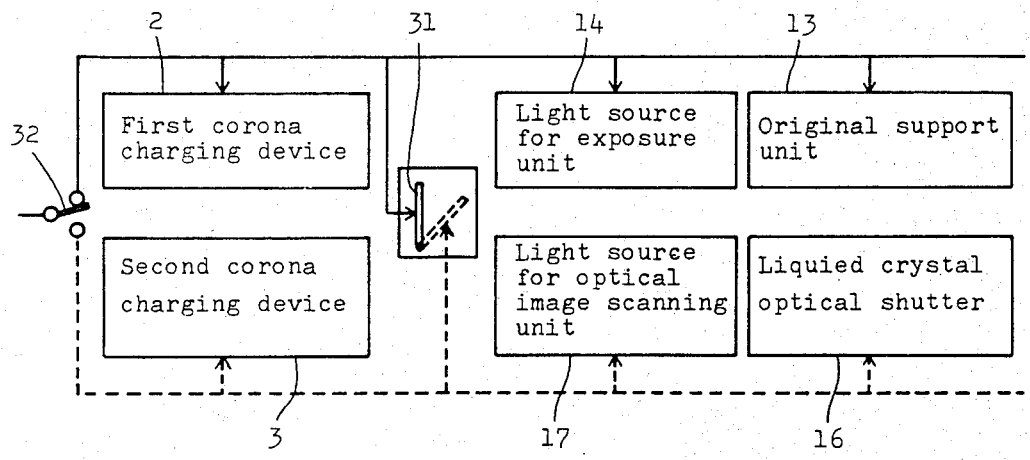

FIG. 1 is a schematic longitudinally sectional front view of an embodiment of the invention, showing arrangement of each part, FIG. 2 is a perspective view of an optical image scanning unit for printing, showing its construction, FIG. 3 is a longitudinally sectional front view showing construction of a liquid-crystal optical shutter used in the scanning unit for printing, FIG. 4 is a view explanatory of construction of segment electrodes at the liquid crystal optical shutter, FIG. 5 shows the arrangement of components in a modified embodiment of the scanning unit for printing and the exposure unit for copying, and FIG. 6 is a view explanatory of a changeover of the copying mode and printing mode of this invention.

Referring to the drawing, reference numeral 1 designates a photosensitive drum, at the outer periphery of which are disposed along the rotation direction of drum 1 a first corona charging device 2, a second corona charging device 3, an exposure unit for copying 4, an optical image scanning unit for printing 5, a developing unit 6, a corona charging device for image transfer 7 and a cleaning unit 8.

Under the photosensitive drum 1 is provided a recording paper transfer passage, from the entrance of which are disposed a paper-feed mechanism 9 for recording paper P, transfer mechanisms 10a and 10b, and a fixing unit 11.

In addition, the photosensitive drum 1 is constructed, for example, by laminating photoconductors on a conductive substrate, and is characterized in that the photoconductor is used which has the photosensitivity to electrical charge in both oppositive and negative polarities, in other words, the photoconductor is capable of easily eliminating electric charge given to the surface of photosensitive member by irradiation of the light regardless of the polarity of the charge, for example, a selenium-arsenic alloy doped with a small amount of sodium or lithium, an electric-charge complex of a mixture of polyvinyl carbazole and trinitro fluorenone, or amorphous silicon, is used.

Among the above, the photoconductor of amorphous silicon especially produced by the glow discharge decomposition method, is said to be extremely proper because of having ideal characteristics, such as heat resistance, surface hardness, wear resistance, photographic sensitivity, optical fatigue resistance and non-public-nuisance, which have never been found in the conventional photosensitive member and because of being applicable of the so-called Carlson process, the simplest and stable imaging process under the steps of charging—picture exposure—development.

The first corona charging device 2 and second corona charging device 3 serve to uniformly electrify the surface of photosensitive drum 1, both the devices 2 and 3 being applied with voltage of polarities opposite to each other, for example, when the first corona charging device 2 is given positive charge, the second corona charging device 3 is given negative charge.

Also, an optional means can selectively switch operations of both the corona charging devices.

Alternatively, one corona charging device may serve as both the first and second corona charging devices 2 and 3 to thereby change the applied voltage polarity.

The exposure unit 4 can use a conventional, well-known desired one as an exposure unit of an electrophotographic copying apparatus. The unit 4 in this embodiment is small-sized and comprises an original support table 13 which places thereon an original and moves in reciprocation, a light source 14 for illumination which irradiates the original from below the table 13, and SELFOC 15a (commercial name of a convergent photo-transmission member): a lens which focuses the reflected image from the original on the photosensitive drum 1.

The scanning unit for printing 5, as shown in FIG. 2, comprises a liquid crystal optical shutter 16, a light source 17, e.g., fluorescent lamp, for irradiation from behind the optical shutter 16, and a SELFOC 15b of a lens for focusing disposed at the photosensitive drum 1 side.

The liquid crystal optical shutter 16, for example as shown in FIG. 3, comprises a combination of a liquid crystal cell 26 with polarizing plates 27 and 28 disposed at both sides of the cell 26, the cell 26 comprising two transparent substrates 20 and 21 having at the opposite surfaces thereof electrodes 22 and 23 composed of transparent conductive films respectively so that a spacer 24 is interposed between the substrates 20 and 21 to form a gap of the predetermined width, into which gap liquid crystal 25 is sealed.

The electrode 22 functions as the electrode in common and segment electrodes 23 are disposed linearly in about 10 to 12 stripes per 1 mm.

The liquid crystal 25 comprises nematic phase liquid crystal which is applied with voltage to put liquid crystal molecular axes in orientation, the polarizing plates 27 and 28 being used and having polarizing axes parallel to each other and to the liquid crystal molecular axes of liquid crystal 25 in orientation.

The liquid crystal cell 26 in the embodiment of the invention is provided at the lower surface of lower polarizing plate 26 except for a central portion with metal vapor coating films 29 for shading. A plurality of segment electrodes 23 in stripes are formed in the dotted portions for practical use as the light shutter as shown by the dotted lines (see dotted portions 23a, 23b to 23n) in FIG. 4 so that the incident light from other portions is shaded. Hence, the liquid crystal 26 is put in actual use within a region of the gap of about 70 to 80 μm in width between both the shading films 29. Thus, a liquid crystal cell 26 needs a minute width so that the cell, for example, of 7 to 8 mm in width is produced and shaded at unnecessary portions by shading films 29 to thereby facilitate the manufacturing.

In the liquid crystal optical shutter 16, the liquid crystal 25, when no voltage is applied, has liquid crystal molecular axes perpendicular to the polarization axes of polarizing plates 27 and 28 and is opaque, but when the predetermined record signal is given to apply voltage between the common electrode 22 and the selected segment electrode 23, the liquid crystal 25 between both the electrodes puts its liquid crystal molecular axes in orientation and in parallel to the polarization axes of polarizing plates 27 and 28, thereby becoming transparent. At this time, the light source 17 behind the liquid crystal optical shutter 16 previously irradiates the light which passes through the upper polarizing plate 27 and then the transparent portion at liquid crystal 25 and the lower polarizing plate 28 sequentially and reaches SELFOC 15b, whereby the optical image in dots is irradiated on the photosensor drum 1.

The segment electrodes 23 in dots in a row is driven selectively in the order of row in synchronism with rotation of photosensitive drum 1 to lead to irradiation of desired images of numerals, characters and symbols on the photosensitive drum 1, in which the record signal to the shutter 16 may be given as an electric signal output from the electronic computer and divided into dotted shape.

In addition, in case that a high resolution of 10 to 12 lines per 1 mm cannot be recorded by use of liquid crystal optical shutter 16, the segment electrodes 23 are arranged in 5 to 6 lines per 1 mm, thereby enabling reduction of the optical image to ½ by the lens.

Also, the liquid crystal optical shutter 16 may be dotted-shaped in plural rows and driven at every row or every line for speed-up.

In this invention, the copying exposure unit 4 and printing scanning unit 5, as shown in FIG. 5, preferably use one SELFOC 15c in common.

In this instance, a reflector 31 is disposed at the light-incident end of SELFOC 15c not to hinder the incidence of the reflected optical image of the original to SELFOC 15c in the copying mode. While, in the printing mode, the reflector 31 is made movable to the position where the light from the printing scanning unit 5 is reflected to be incident into SELFOC 15c. Concretely, the reflector 31, as shown, is mounted rotatably on the side of passage of the reflected optical image from the original 12, whereby being rotated around the one end of reflector 31 when in the priting mode. Or, the reflector 31, not shown, may be slanted to be shifted toward the side of SELFOC 15c when in the copying mode. In either case, the reflector 31 may be rotated or shifted by use of a well-known mechanical or electromagnetic mechanism.

It is preferable to rotate or shift the reflector 31 in association with the changeover of copying mode and printing mode. In this instance, referring to FIG. 6, a changeover switch 32 may be switched so that in the copying mode, the first corona charging device 2, light source 14, and original support table 13, are made operable, and in the printing mode, the second corona charging device 3, light source 17 and liquid crystal optical shutter 16, are made operable, at which time the reflector 31 positioned as shown by the solid line in FIG. 5 is turned to the position shown by the dotted line.

Next, the developing unit 6 may use various types of well-known ones, but the embodiment of the invention adopts a magnetic brush photographic developing apparatus.

In this developing appratus, a two component series developer comprising a carrier and toner is contained, the carrier and toner being agitated to frictionally charge the toner, for example, in the negative polarity, which polarity is selected to be opposite to the polarity of electric charge at the electrostatic latent image during the copying mode and homopolar with that during the printing mode.

The corona charging device for image transfer 7, when the recording paper P is superimposed on the toner image formed on the surface of photosensitive drum 1, gives potential in the opposite polarity to the toner, that is, the positive polarity, to the paper from the back thereof to thereby transfer the toner image to the surface of paper P.

The cleaning unit 8 and fixing unit 11 may use various types of well-known ones, but this embodiment adopts a cleaning method by blades and a fixing process by a heating roll.

Incidentally, a desired discharging device may be interposed between the transfer corona charging device 7 and the cleaning unit 8.

Next, operation of the copying and printing apparatus in the copying mode will be described.

In the copying mode, the second corona charging device 3 and printing scanning unit 5 are made not-operative and the first corona charging device 2 and copying exposure unit 4 are made operative. At first, the first corona charging device 2 charges uniformly positively the surface of photosensor drum 1, and next, the exposure unit 4 irradiates onto the surface of photosensitive drum 1 the optical image corresponding to the image on the original 12, whereby the electrostatic latent image is formed on said surface. The photosensitive drum 1, on which the electrostatic latent image is formed, is given toner of negative polarity by the developing unit 6 to form a visible toner image on the drum 1 and then the recording paper P is fed by a paper feed mechanism 9 and superimposed on the surface of photosensitive drum 1 carrying the toner image. Then, the transfer corona charging device 7 gives potential of positive polarity to the paper P from the rear thereof to thereby transfer the toner image onto the recording paper P. The recording paper P is then peeled off from the photosensitive drum 1 and conveyed to the fixing unit 11 by transfer rolls 10b. The paper P passes therethrough to fix thereon the toner image and then is discharged from the apparatus. On the other hand, the photosensitive drum 1 which has finished the transfer process is cleared of the residual toner by the cleaning unit 8, thus ending one copying process.

Next, operation in the printing mode will be described.

In this case, the second corona charging device 3 and printing scanning unit 5, in comparison to the copying mode, are actuated. At first, the second corona charging device 3 charges the surface of photosensitive drum 1 negatively. Next, the dot-like shaped optical image is irradiated sequentially onto the surface of drum 1 by the printing scanning unit 5 corresponding to the record signal, thereby forming the electrostatic latent image of about zero potential in its image region to be recorded. Subsequently, the photosensitive drum 1 is given the negatively charged toner to perform the reverse development. Hence, the positive toner image, formed from toner adhering to region of image to be recorded, is formed on the photosensitive drum 1.

The subsequent process is the same as in the copying mode so that the toner image is transferred on the recording paper P and fixed thereon, thus completing the desired recording (printing).

As seen from the above, this invention employs the photosensitive member having the photosensitivity to electrical charge in both positive and negative polarities so that a simple operation merely of changing over the electrical charge polarity in the copying and printing modes and the use of single developing unit, can selectively perform normal development in a case of the copying mode and reverse development in the printing mode.

The copying and printing apparatus of this invention, in the printing mode, irradiates the recording region on the photosensitive member and the so-called negative electrostatic latent image having electric charge is formed in the not-recording region to thereby perform the reverse development. Hence, the photosensitive member is relatively less fatigued by the irradiation of the light and reduces the drive portion at the liquid crystal optical shutter, thereby improving the life-time and stability of photosensitive member and liquid crystal optical shutter.

Furthermore, the optical image scanning unit employs the light source and liquid crystal optical shutter in combination, which makes the optical image scanning unit extremely small-sized and inexpensive in comparison with the conventional laser scanning unit or CRT, thereby making it possible to provide the copying and printing apparatus considerably small-sized and inexpensive to produce.

In addition, when SELFOC of extremely short focal length is used in combination as the lens for focussing on the photosensitive member the light in dots passing through the liquid crystal optical shutter, the space occupied by the printing scanning unit can extremely be restricted. Furthermore, one SELFOC can be used in common for the copying exposure unit and printing scanning unit, whereby the printing scanning unit can be effectively effectively in an allowable space in the conventional electrophotographic copying machine. As a result, it is possible to an extremely small-sized the electrophotographic copying and printing apparatus which is inexpensive to produce.

This invention is not limited to the above embodiment, but various variations may be made without departing from the scope of the invention. For example, an optical system moving type may be used in place of the original support table moving type.

What is claimed is:

1. An electrophotographic recording apparatus having both functions of copying and printing comprising:
   a photosensitive member having photosensitivity to electrical charging in both positive and negative polarities,
   an electrical charging unit for uniformly charging the surface of said photosensitive member selectively in either positive or negative polarity,
   a first changeover means for changing the charging polarity of the photosensitive member in accordance with a copying mode and a printing mode,
   an exposure unit for the copying mode including an optical system which projects onto the surface of said charged photosensitive member an optical image corresponding to an image of an original placed on an original support table,
   an optical image scanning unit for the printing mode for irradiating onto the surface of said charged photosensitive member a recording region corresponding to a record signal,
   a second changeover means for changing operations of said exposure unit and optical image scanning unit in accordance with the copying mode and printing mode, a single developing unit for developing an electrostatic latent image formed on the surface of said photosensitive member, said developing unit having a toner of a predetermined polarity so as to effect an ordinary development of the electrostatic latent image formed by the operation of said exposure unit for the copying mode and effect a reversal development of the electostatic latent image formed by the operation of said optical image scanning unit for the printing mode, and a transfer unit being applied voltage of the polarity opposite to the polarity of the toner so as to transfer the developed image onto a recording member.

2. An electrophotographic recording apparatus according to claim 1, wherein a changeover of said first changeover means is conducted together with a changeover of said second changeover means so that the electrical charge polarities of the electrostatic latent image in the copying and printing modes are inverted.

3. An electrophotographic recording apparatus according to claim 1, wherein said photosensitive member is made of a selenium-arsenic alloy.

4. An electrophotographic recording apparatus according to claim 1, wherein said photosensitive member is made of an electrical charge transfer complex comprising a mixture of polyvinyl carbazole and trinitrofluorene.

5. An electrophotographic recording apparatus according to claim 1, wherein said photosensitive member is made of amorphous silicon.

6. An electrophotographic recording apparatus according to claim 5, wherein said photosensitive member made of amorphous silicon is formed by a glow discharge decomposition method.

7. An electrophotographic recording apparatus according to claim 1, wherein said scanning unit has a light source and a liquid crystal optical shutter so that the light irradiated from said light source irradiates through a liquid crystal optical shutter a recording region onto the surface of said photosensitive member corresponding to the record signal.

8. An electrophotographic recording apparatus according to claim 7, wherein said liquid crystal optical shutter comprises a liquid crystal cell and two polarization plates positioned at both sides of said liquid crystal cell and having parallel polarization axes.

9. An electrophotographic recording apparatus according to claim 7, wherein said liquid crystal optical shutter has a pair of shading films for restricting a width through which the irradiation light passes.

10. En electrophotographic recording apparatus according to claim 7, wherein said pair of shading films are disposed at an interval of 70 to 80 $\mu$m.

11. An electrophotographic recording apparatus according to claim 1, wherein a lens for focusing is interposed between the original support table and the photosensitive member, and a moveable reflector is provided at the light incidence side of said lens so that said reflector, in the copying mode, is shifted toward the position where the reflected light from said original is incident on said lens, and in the printing mode, toward the position where the optical image by said scanning unit is incident on the same, said exposure unit and optical image scanning unit using one lens in common as the optical system therefor.

12. An electrophotographic recording apparatus according to claim 11, wherein said reflector is moved together with changeover of the first changeover means.

13. An electrophotographic recording apparatus according to claim 11, wherein said one lens as the optical system, which is interposed between said original support table or liquid crystal optical shutter and said photosensitive member, comprises a convergent phototransmission member.

14. An electrophotographic apparatus which can function in either a copying mode of operation thereby facilitating the direct copying of a fixed optical image or a printing mode of operation thereby facilitating the printing of an optical image input into the apparatus as an electrical record signal corresponding to the optical image, comprising:

a photoconductive member;

a charging means for uniformly charging the surface of the photoconductive member with a charge of first polarity when the electrophotographic apparatus is in the copying mode and for uniformly charging the surface of the photoconductive member with a charge of second polarity opposite to the charge of the first polarity when the electrophotographic apparatus is in the printing mode;

copying image formation means for forming a latent image on the photoconductive member when the electrophotographic apparatus is in the copying mode;

printing image formation means for forming a latent image on the photoconductive member when the electrophotographic apparatus is in the printing mode;

toner means for charging toner and for applying the charged toner to the photoconductive member after the latent image is formed thereby forming a toner image on the photoconductive member, the toner being charged with the charge of first polarity when the electrophotographic apparatus is in either the printing mode or copying mode; and transfer means for applying a charge to a recording member and for transferring the toner image to the recording member, the transfer means applying the charge of second polarity to the recording member when the electrophotographic apparatus is in either the printing mode or the copying mode.

15. An electrophotographic apparatus which can function in either a copying mode of operation thereby facilitating the direct copying of a fixed optical image or a printing mode of operation thereby facilitating the printing of an optical image input into the apparatus as an electrical record signal corresponding to the optical image, the electrophotographic apparatus having copying image formation means for forming a latent image on a photoconductive member when the electrophotographic apparatus is in the copying mode, printing image formation means for forming a latent image on the photoconductive member when the electrophotographic apparatus is in the copying mode, toner means for charging toner, and for applying the charged toner to the photoconductive member after the latent image is formed thereby forming a toner image on the photoconductive member, transfer means for applying a charge to a recording member and for transfering the toner image to the recording member, the improvement comprising:

a photoconductive member; and charging means for uniformly charging the surface of the photoconductive member with a charge of first polarity when the electrophotographic apparatus is in the copying mode and for uniformly charging the surface of the photoconductive member with a charge of second polarity opposite to the charge of first polarity when the electrophotographic apparatus is in the printing mode, wherein the toner means charges the toner with the charge of first polarity when the electrophotographic apparatus is in either the printing mode or the copying mode, and wherein the transfer means applies the charge of second polarity to the recording member when the electrophotographic apparatus is in either the printing mode or the copying mode.

16. An electrophotographic apparatus according to claim 14 wherein the surface of the photoconductive member comprises a photoconductive material selected from the group consisting of selenium-arsenic alloy doped with sodium, selenium-arsenic alloy doped with lithium, polyvinyl carbazoletrinitro fluorenone charge transfer complex and amorphous silicon.

* * * * *